Dec. 13, 1960 L. E. SODERQUIST 2,963,737
MACHINE FOR TIRE MANUFACTURE (POST INFLATION)
Filed July 28, 1958 8 Sheets-Sheet 1

INVENTOR.
LESLIE E. SODERQUIST
BY Ely, Frye & Hamilton

ATTORNEYS

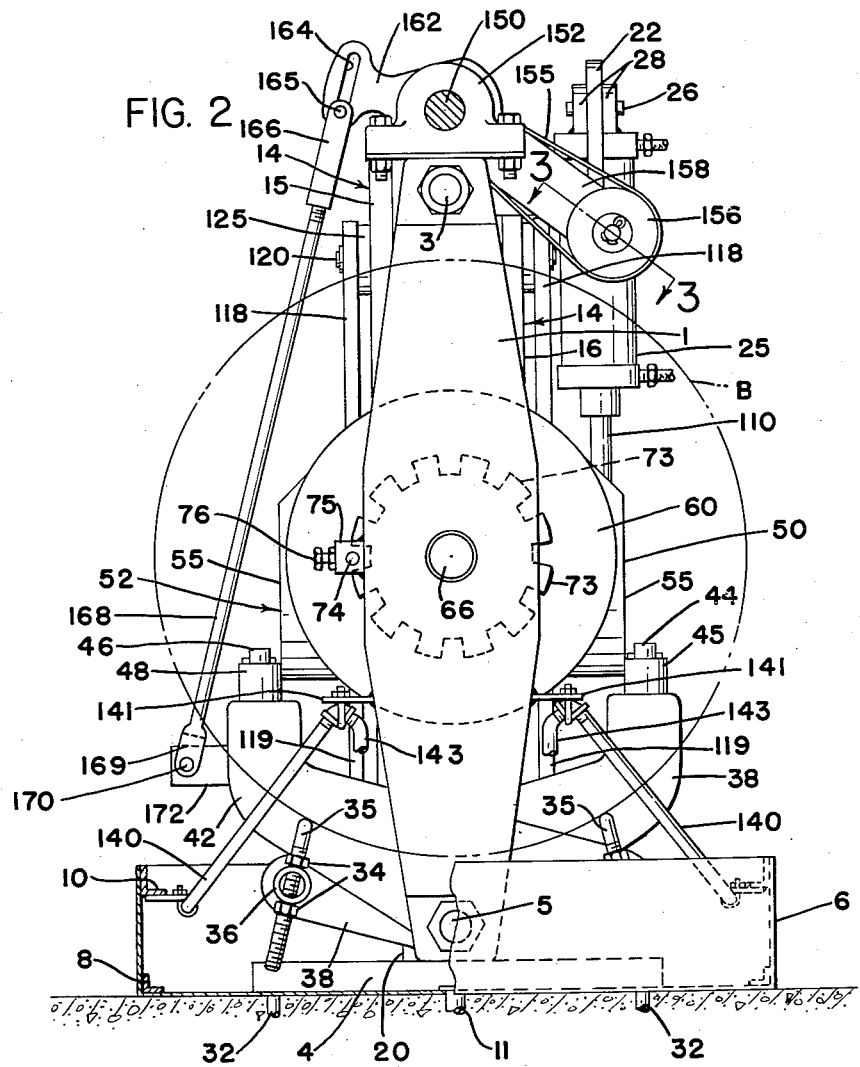

Dec. 13, 1960     L. E. SODERQUIST     2,963,737
MACHINE FOR TIRE MANUFACTURE (POST INFLATION)
Filed July 28, 1958     8 Sheets-Sheet 3

*INVENTOR.*
LESLIE E. SODERQUIST
BY
ATTORNEYS

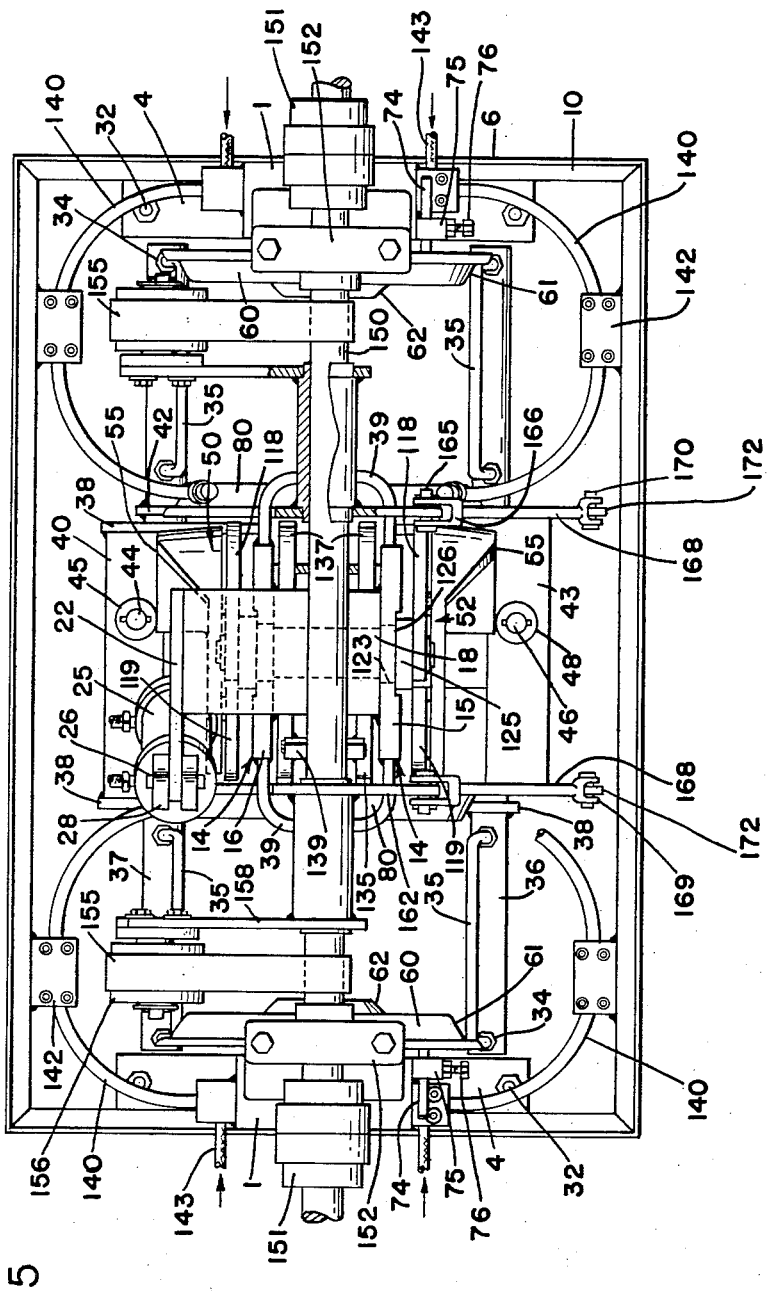

Dec. 13, 1960 L. E. SODERQUIST 2,963,737
MACHINE FOR TIRE MANUFACTURE (POST INFLATION)
Filed July 28, 1958 8 Sheets-Sheet 6

INVENTOR
LESLIE E. SODERQUIST
BY Ely, Frye & Hamilton
ATTORNEYS

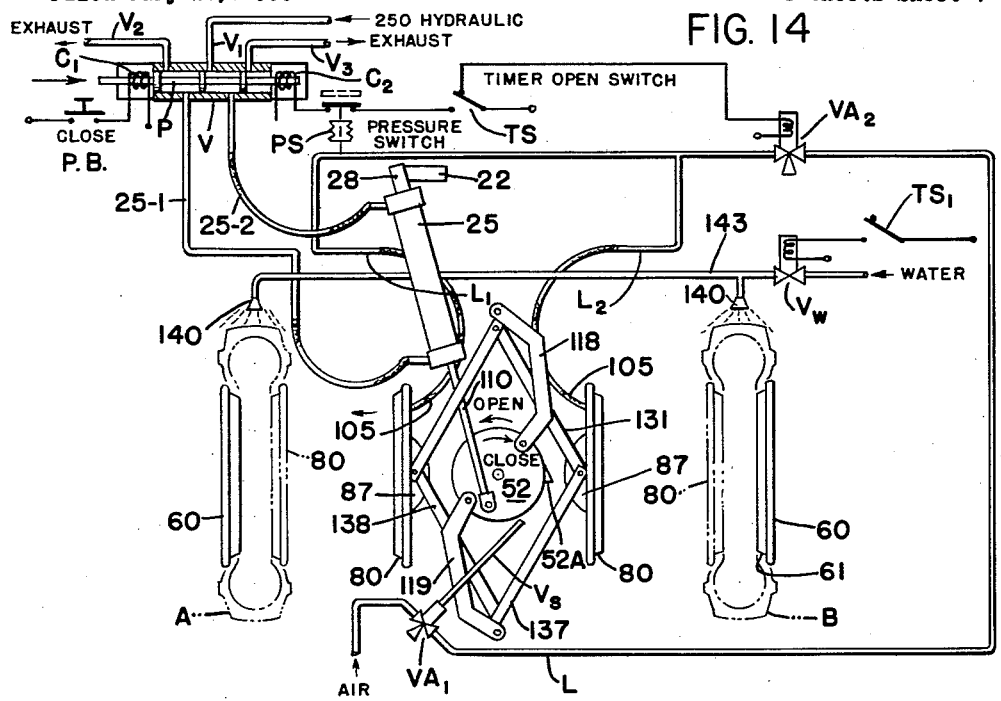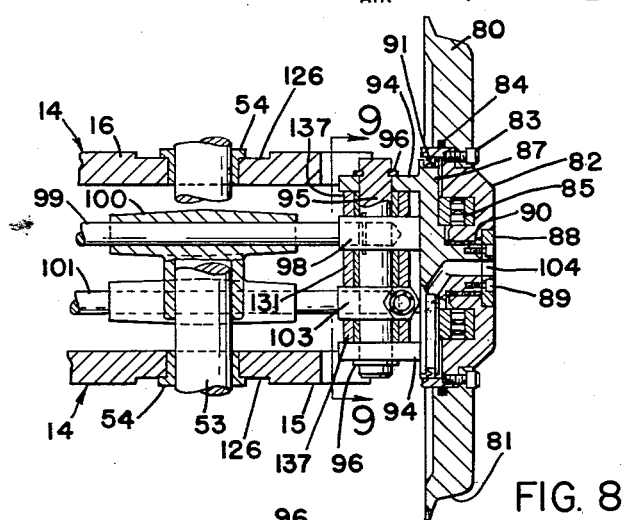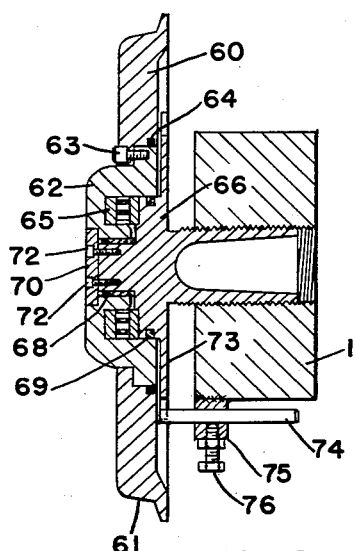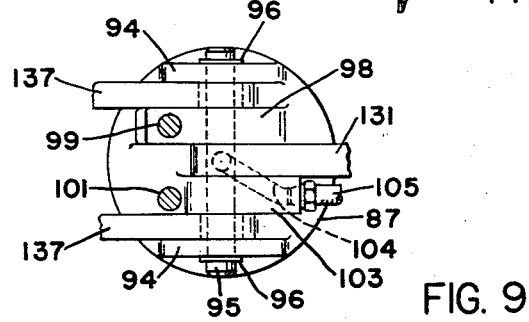

Dec. 13, 1960 L. E. SODERQUIST 2,963,737
MACHINE FOR TIRE MANUFACTURE (POST INFLATION)
Filed July 28, 1958 8 Sheets-Sheet 8

*INVENTOR.*
LESLIE E. SODERQUIST
BY Ely, Frye & Hamilton
ATTORNEYS

United States Patent Office 2,963,737
Patented Dec. 13, 1960

2,963,737
MACHINE FOR TIRE MANUFACTURE
(POST INFLATION)

Leslie E. Soderquist, Silver Lake, Ohio, assignor to The McNeil Machine & Engineering Company, Akron, Ohio, a corporation of Ohio Filed July 28, 1958, Ser. No. 751,245

13 Claims. (Cl. 18—2)

It is known that when tires, the body plies of which are made from nylon cords or synthetic filaments having like properties, are taken out of the mold and allowed to cool, the nylon cords will shrink. If measures are not taken to prevent shrinkage, the tires will be distorted, the tread rubber will crack from the stresses placed upon it, and the tire will be ruined.

To offset this condition it has been the practice to inflate nylon tires immediately after they come out of the vulcanizer and hold them in inflated condition at adequate pressures until the tires have cooled down to a point where shrinkage of the nylon cords has ceased. The tires are usually subjected to temperatures between 315° and 350° F. during vulcanization and should be inflated at from 50 to 60 lbs. internal pressure until the temperature of the tires has been reduced to approximately 200° F., at which point the shrinkage of the nylon cords will no longer be a factor. This procedure has been called in the art "post inflation."

In applicant's prior application Serial No. 670,068, filed July 5, 1957, there is shown an apparatus for post inflating nylon tires automatically as they are delivered from a press of the type in which the tires are cured on a diaphragm which is a permanent part of the press.

The present invention is in the nature of a modification of the machine shown in the former application in that the present machine is designed primarily for the "post inflation" of nylon tires which are handled manually and may be cured upon air bags, and in which the tires as they are taken out of the vulcanizer are placed manually in a machine such as shown herein. The machine is not limited to use with tires on air bags, but it will be described for air-bag cured tires.

In the machine of this application the operator at the vulcanizer, which is usually a dual vulcanizer, removes both tires, with or without their air bags, from the vulcanizer and deposits them in the machine and presses a starter button. The tires are thereupon automatically rimmed up at the beads, it being essential that they be not supported on the tread surfaces because the weight of a tire resting upon any object will cause distortion while the tire is cooling.

It is necessary to rotate the tire during the cooling down period because there will usually be a residual pool of the hot cooling medium, usually condensate, in the air bag which, if held for any period at one spot in the tire, will cause uneven cooling and distorted tires. In the machine shown herein, as soon as the button is pressed the tires will be clamped at the beads between two rotatable disks and started in rotation, usually at 10 to 20 r.p.m., which serves to offset any localized effects of the residue in the air bag.

It is desirable to spray the tire during the time when it is in the machine and the spray should preferably be automatically turned on and off.

After an interval which is sufficient to cool the tire down below the critical temperature, the tire is released from the disks and can be removed by the operator.

The machine is shown in dual form, so that the two tires may be cooled simultaneously, and this is desirable as the majority of vulcanizing presses are of the dual type, but the principles of the invention may be applied to the single tire form.

The means for automatically controlling the operations of the machine may be a standard timer which, through appropriate connections, controls the several operations. The details of such an automatic control device can be readily designed by one familiar with timers which are commonly employed on vulcanizers and many other machines.

In the drawings and description there are shown two types of the invention, one which rotates the tire from the tread area, and the other which rotates the tire from the beads.

The invention is shown in its best known embodiments as the same have been constructed for the purpose, but it will be understood that modifications and improvements may be made without departing from the basic features of the invention as set forth in the claims.

In the drawings:

Fig. 1 is a front elevation of a dual machine for the purpose of post-inflating and cooling tires. In this view the tires A to the left and B to the right are not rimmed up. A typical air bag is indicated at C.

Fig. 2 is a side elevation from the right as seen in Fig. 1.

Fig. 3 is an enlarged detail section on the line 3—3 of Fig. 2.

Fig. 5 is a plan view of the machine.

Fig. 8 is a detailed section on line 8—8 of Fig. 1, showing a movable rimming-up closure or disk.

Fig. 9 is a detail on the line 9—9 of Fig. 8.

Fig. 10 is a section through the stationary rimming-up closure or disk; this view is taken on the line 10—10 of Fig. 1.

Fig. 14 is a schematic view showing the manner of connecting the controls for operating the machine.

Figure 1:
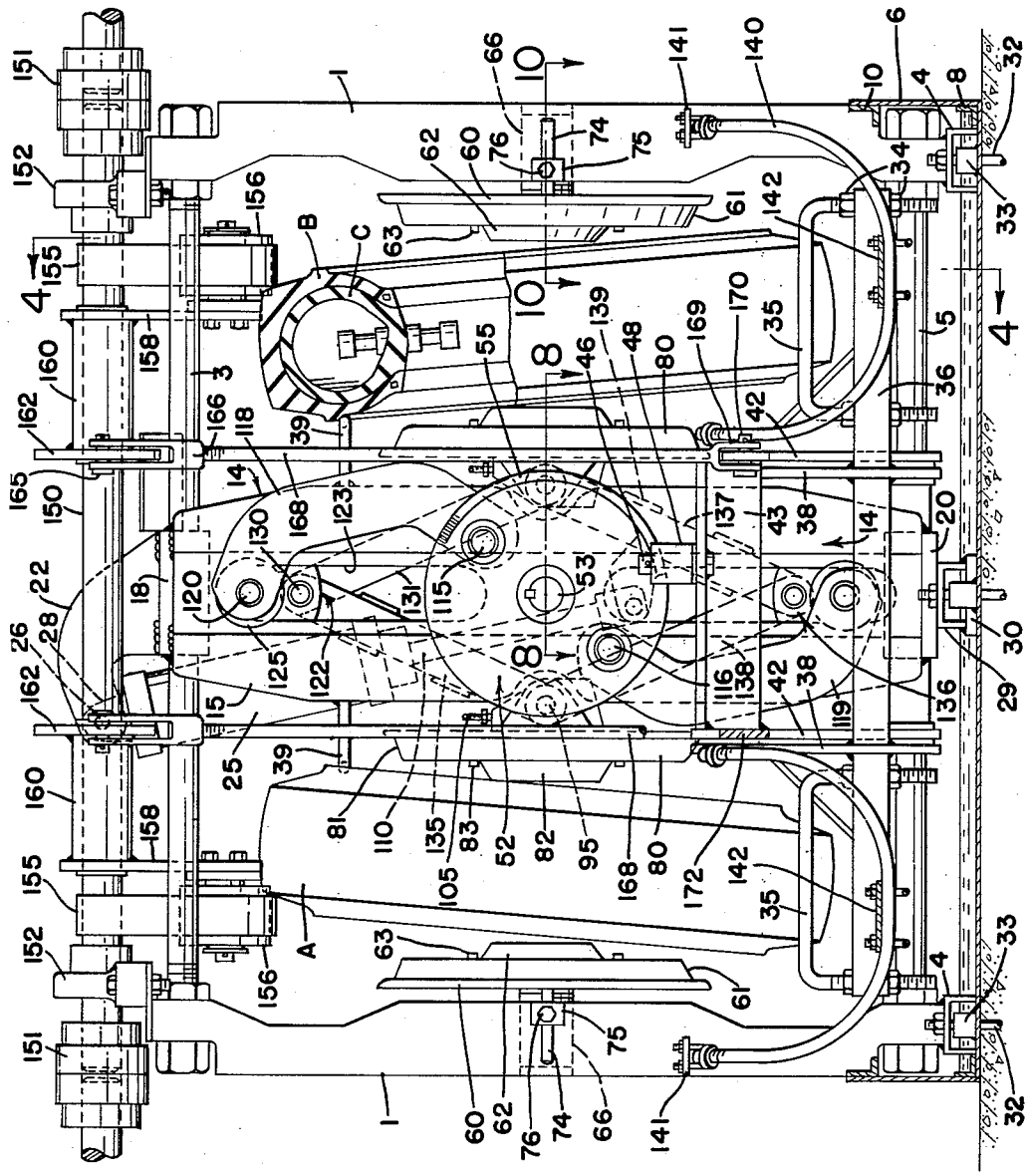

The machine is located in a frame composed of the opposed vertical stanchions 1 which are located at the ends of the machine and are held together at their upper ends with an upper longitudinal tie rod 3. The lower ends of the stanchions are welded to two channel-shaped plates 4 and are connected by a lower longitudinal tie rod or shaft 5. Beneath the machine and beneath the channels 4 is a pan 6, the walls of which extend upwardly to a sufficient height to retain the overflow cooling water. The pan is reinforced by angle irons 8 welded to the lower inside corners and by similar angle irons 10 which are welded about the upper inner edge of the pan. Drain holes 11 are provided in the pan.

Located midway of the machine is a center stanchion indicated as a whole by the numeral 14. This stanchion is composed of a front plate 15 and a rear plate 16 which are held in parallel spaced relation to accommodate certain working parts by a cross plate 18 welded to their upper ends, and a cross plate 20 welded to their lower ends. The upper plate 18 is extended rearwardly of the center stanchion and to it is attached a bracket 22 upon which the operating cylinder 25 is attached through the pivot pin 26 passing through a pair of lugs 28 on the top of the cylinder. The lower cross plate 20 is welded to a third channel 29 which is in turn welded to a base plate 30 in the bottom of the pan.

The pan and the entire machine are secured to the floor by bolts 32 which go through the several channels 4 and 29 and through sleeves 33 welded to the bottom of the pan.

Figure 4:
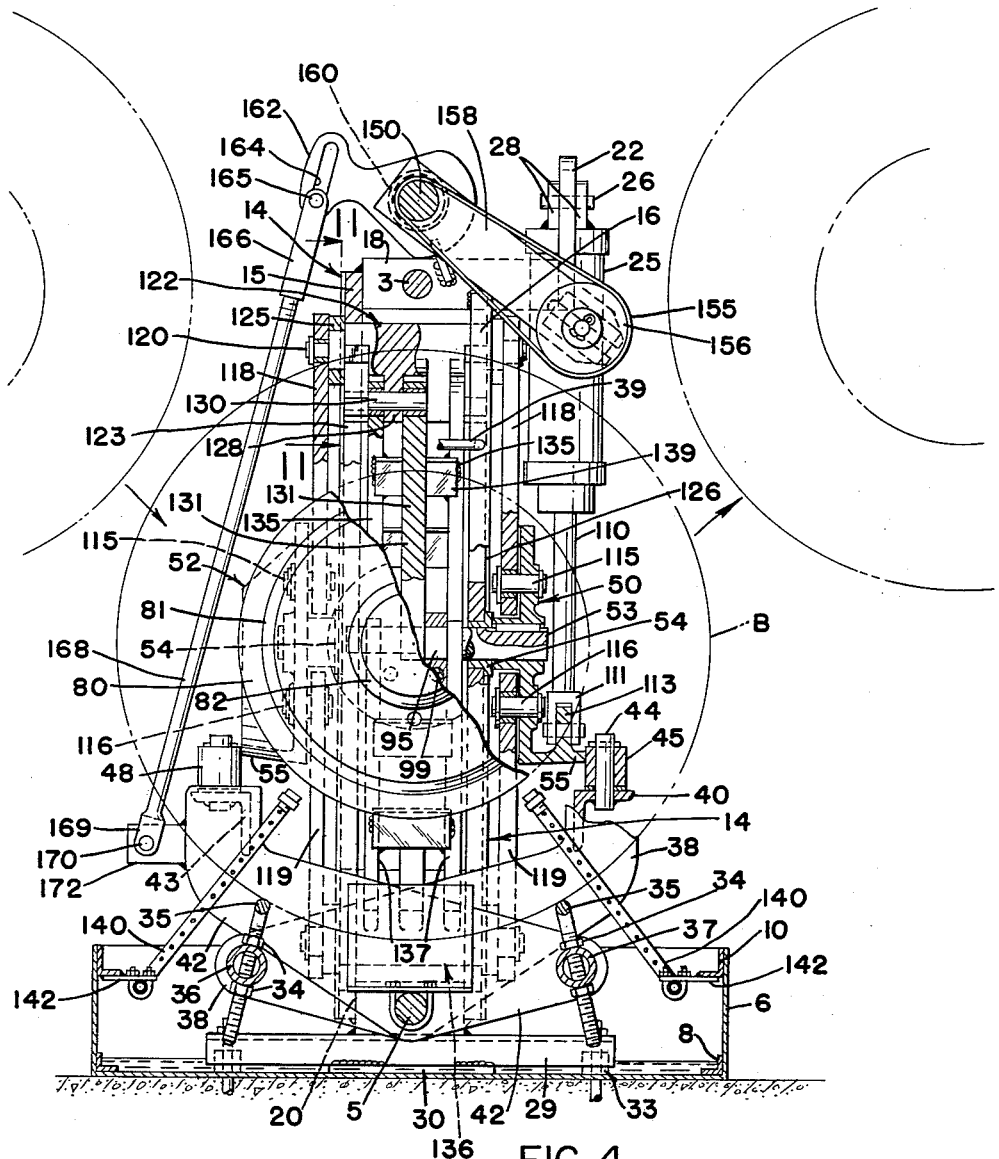
Fig. 4 is a vertical section through the machine on the line 4—4 of Fig. 1.
Figure 11:
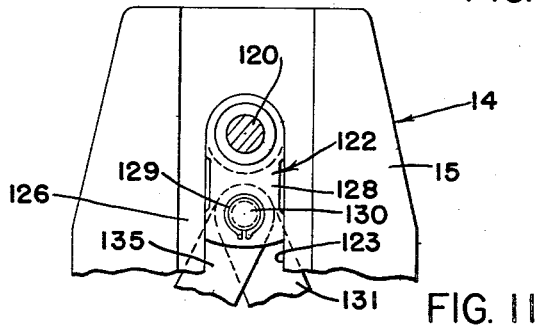
Fig. 11 is a detail on the line 11—11 of Fig. 4.

When the machine is idle, as shown in Figs. 1 and 4, each tire is supported on a pair of inverted U-shaped rods or stirrups 35, the downturned threaded ends of which pass through parallel tubular shafts 36 and 37 near the base of the machine, being held in adjusted position for different sizes of tires by lock nuts 34. The tires, positioned by the stirrups 35 transversely of the machine frame, will lean against stop rods 39 which are welded to the edges of the plates 15 and 16.

The front shaft 36 is located in the lower ends of two parallel rocker arms 38 which are connected at their other ends by an angular cross plate 40 to which the ends of the arms 38 are welded. The rear shaft 37 is located in two parallel rocker arms 42, the upper ends of which are welded to a similar angular cross plate 43. Located on the cross plate 40 is a bearing pin 44 upon which is rotatable a cam follower or roller 45 and on the cross plate 43 is a similar pin 46 on which is the rotatable cam follower or roller 48. The two sets of similar, and preferably identical, but oppositely directed rocker arms 38 and 42 are pivoted on the lower tie rod 5.

Figure 7:
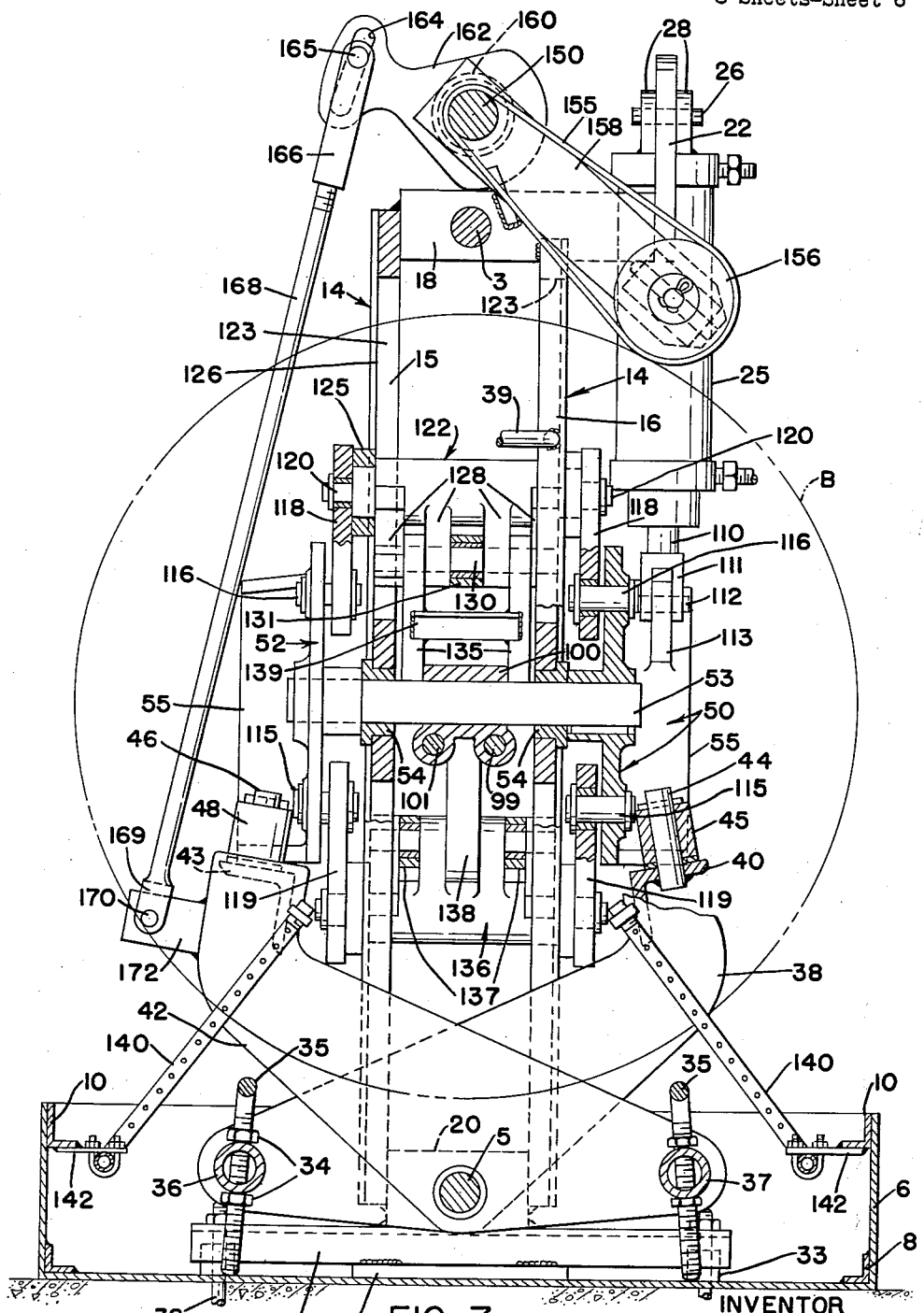
Fig. 7 is a vertical section substantially on line 7—7 of Fig. 6.

The preponderance of weight of each of the rocker arm units is on the side which carries the two stirrups 35 so that the arms tend to stay in the position shown in Fig. 7, which is their non-tire supporting position. The cam roller 45 is kept by the unbalanced weight of the arm 38 against the face of a large cam disk 50 and the cam roller 48 is kept against the face of the cam disk 52. These cams are on opposite sides of the center stanchion 14 and are keyed to a shaft 53 which is located in bearings 54 in the two uprights 15 and 16.

Projecting from the outer face of each cam disk 50 and 52 is a cam surface in the form of a rib 55 on which the respective rollers 45 and 48 will ride when the cam is rotated to elevate or raise the stirrups 35 into tire supporting position, as shown for example in Fig. 4.

When the machine is idle, the pairs of stirrups on each side of the machine are raised to receive a hot vulcanized tire from the press. As the press is presumably a dual press, the operator will load both tires into the machine without any delay. It is essential that the tires rest only momentarily on the stirrups because any stay of appreciable duration would put a permanent distortion in the tires. The machine, therefore, is arranged to hold the tires by their beaded edges during the cooling down period and while the tires are rotated for the reasons stated.

Located on each stanchion 1 is an outer rimming-up closure or disk 60 (Fig. 10) which faces toward the center of the machine and is formed on its outer perimeter with a bead seat 61 which is in substantial register with the outer bead of the opposing tire A or B, and makes an airtight seal with the bead. The disk is secured to a hub 62 by bolts 63, an O-ring 64 making an airtight seal with the hub. The interior of the hub is hollowed out to accommodate anti-friction bearings 65 by which the disk is mounted on a bearing stud 66 that is provided with a threaded stem received in a threaded opening in the stanchion 1. A packing sleeve 68 and a gasket 69 are provided to prevent air from escaping from the interior of the tire, and a lock plate 70 secured by bolts 72 holds the disk on the bearing stud.

It is desirable to have the rimming-up disks adjustable so as to fit various bead widths of the tires for which reason the threaded mounting is provided for the bearing stud. To hold the stud in adjusted position, it is provided with a flange 73 which is notched on its edge, the notches being engaged by a locking pin 74 which is slidable through a lug 75 on the stanchion and is held by a set screw 76.

The opposing or inner rimming-up closures or disks are indicated by the numerals 80 and have a substantially horizontal common axis with the closures 60. One of these disks is shown in detail in Fig. 8. Each has a bead seat 81 and is held on a hub 82 by bolts 83, an O-ring 84 sealing the crevice between the hub and the disk. The hub is supported by roller bearings 85 on a plate 87, the front face of which extends into a recess in the hub and is held to the hub by a plate 88 and bolts 89. Packing gland 90 seals the space between the hub and the plate at the center and a gasket 91 seals the space around the periphery of the plate.

On the inner face of each plate 87 are two raised lugs 94 having aligned openings through which is passed a connecting pin 95 held in position by snap rings 96. Also projecting from the inner face of the plate 87 is a third lug 98 to which is secured a guide rod 99 which extends toward the center of the machine. This rod is received with a sliding fit in a passage formed in a dual guiding sleeve 100 which is fitted over the cam shaft 53.

A similar guide rod 101, which is fastened to the left hand rimming-up disk 80, is received in a similar passage in the sleeve 100 but at the opposite side of the shaft 53. The purpose of these rods is to guide the two rimming-up disks 80 in their movement toward and from their companion rimming-up disks 60.

On the inner face of the disk 80 is a fourth lug 103, and this lug is provided with an air passage 104 which opens into the interior of the tire at the face of the hub 82 and, at its inner end, is connected to a flexible hose 105 which is connected to a source of compressed air and is provided, at a convenient point, with a valve $VA_1$ (Fig. 14) which is opened by one of the cam disks 50 and 52 to admit air to the tire when the beads of the tire are engaged by the rimming-up disks. This valve will also close to the source of air under pressure and open to the atmosphere just before the end of the cooling period and before the tire is released from its rimming-up disks.

The mechanism for moving the disks 80 toward and from their companion disks 60 will now be described.

Figure 6:
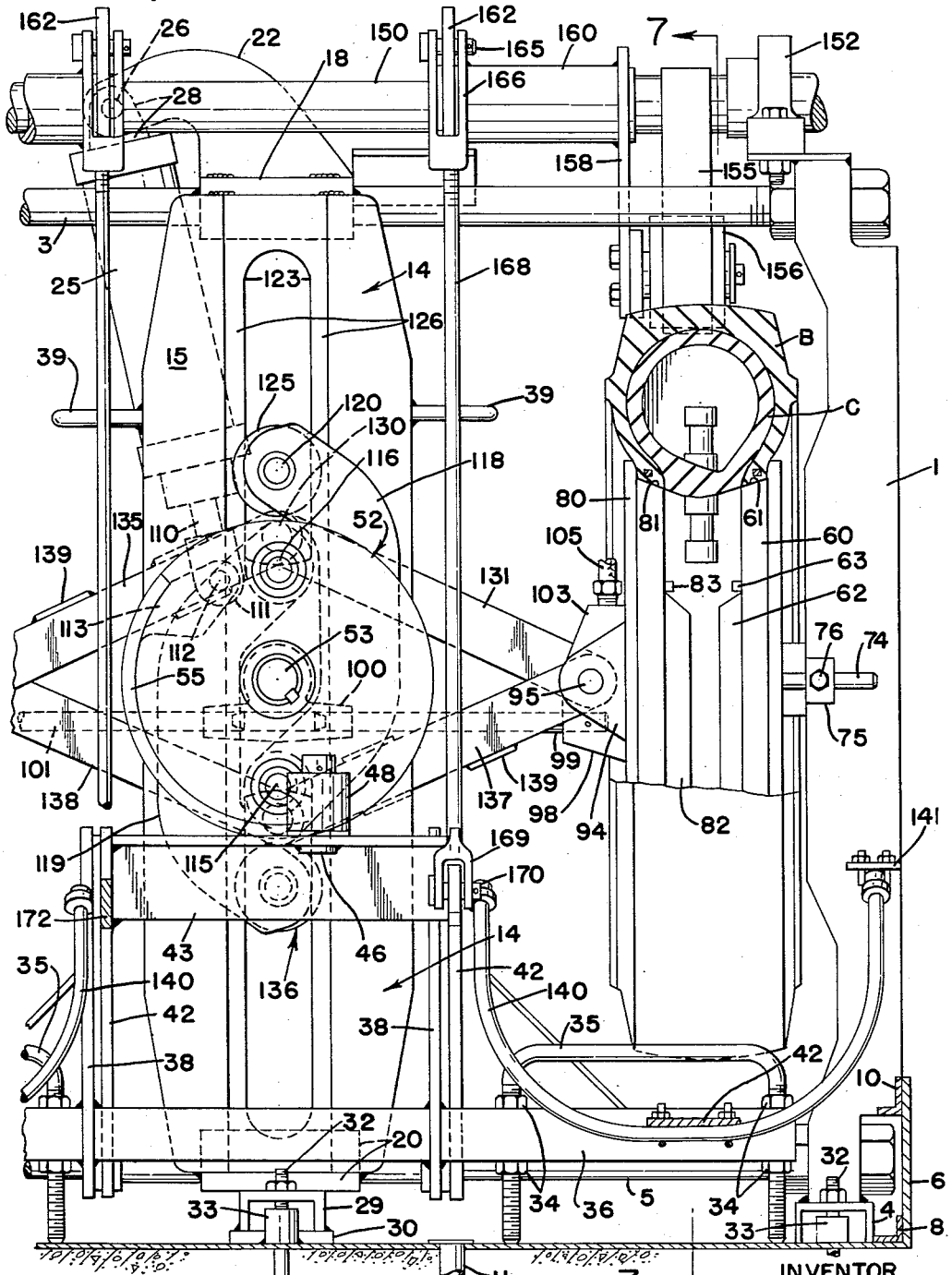
Fig. 6 is an enlarged front elevation of the right hand side of the machine showing the tire B rimmed up and rotating as during the cooling operation.

The cylinder 25 is a double acting cylinder and the piston rod 110 extends downwardly and is fitted with a clevis 111 which is connected by a pivot pin 112 to a bearing lug 113 on the rear face of the rear cam disk 50. When pressure is admitted to the bottom of the cylinder 25, the cam disks 50 and 52, which are keyed to the shaft 53, will be rotated approximately 160° from the position shown in Fig. 1 to that shown in Fig. 6 or Fig. 7. This action will not only serve to rim up the two tires by mechanism to be described, but it will also lower the stirrups 35 so as to free the tire from contact with any object except at the beads.

In each cam disk at opposite sides of the center shaft 53 are located bearing pins, 115 designating the upper bearing pin on each disk and 116 the lower bearing pin. On each pin 115 is pivoted an upwardly extending link 118 and on each pin 116 is pivoted a downwardly extending link 119. The links 118 are journaled on bearings 120 which are formed as extensions from a sliding block 122 which is located between the stanchions 15 and 16 and is movable up and down therein when the piston rod 110 is activated, the block being at its uppermost point when the piston rod is extended, as shown in Fig. 1. The block is slidable in the vertical slots 123 in the stanchions, and on the reduced outer ends of the block where they project through the stanchions are collars 125 which ride on bearing surfaces 126 formed on the outer faces of the stanchions 15 and 16.

From the lower side of the block 122 extend four spaced parallel arms 128, through which is passed a shaft 130 which serves as the bearing for the upper ends of the disk operating links and is held in place by snap rings 129. Between the two center arms 128 is pivoted a single link 131 which extends to the right hand rimming-up disk 80 where its lower end is received between the lugs 98 and 103 and over the connecting pin 95.

Between each pair of outer arms 128 is pivoted, on the shaft 130, the two parallel link members 135 which extend downwardly to the left hand rimming-up disk 80, where they are received between lugs similar to the lugs 94—98 and 94—103.

In the lower ends of the stanchions 15 and 16 is located a sliding block 136 similar to the block 122 and similarly fitted with bearings for a pair of links 137 which go to the right hand disk 80 and a single link 138 which goes to the left hand disk 80. Each pair of links 135 or 137 is cross connected by plates 139 welded thereto.

It will be seen, starting with the condition shown in Fig. 1, that when the operator presses the button the valve to the lower end of the cylinder 25 is opened and the rod 110 retracted, which rotates the cams 50 and 52. Rotation of the cams causes the linkage 131, 135, 137 and 138 to move the disks 80 outwardly until the two tires are clamped by their beads between the pairs of disks 60—80. At this time, the rollers 45—48 will ride down from the high surfaces of their respective cams, dropping the stirrups 35 away from the tires, and the tires will then be supported only by their beaded edges.

At the same time air under pressure will be admitted to the tires and will find its way between the air bags and the inner surfaces of the tires, so as to keep the tires inflated under sufficient pressure to withstand the contracting force of the nylon filaments as they cool down below vulcanizing temperature.

In the case of some tire manufacturers, it is thought desirable to allow the tires to cool down by mere exposure to the air for a limited period so as to provide a sort of post-vulcanization through the residual heat of the tire. In many cases, however, the cooling down is completed or hastened by spraying the tires. In the present machine, spray pipes 140 are located beneath each tire and while the tire is rotating the sprays will be turned on by the timer.

After the requisite cooling period, which is usually about the same duration as the curing cycle in the present method, the automatic timer will release the air pressure on the tire, turn off the spray, and admit pressure to the top side of the cylinder 25 which raises the stirrups 35 and opens up the disks 60—80, so the tires are ready to be taken out of the machine and replaced by freshly vulcanized tires.

The sprays 140 referred to above may be of any type. As shown, they are curved pipes which are supported by brackets 141 at their ends and at their central points by plates 142 fastened to the angle iron 10 in the pan 6. The sprays receive the water from lines 143 in which a timer controlled valve is located.

It is desirable to rotate the tires during the cooling down period, particularly if they are on air bags, and for this purpose, in the form of the invention shown in Fig. 1 and related figures, there is provided, across the top of the machine, at the rear, a shaft 150. In standard installations in a tire factory there will be a battery of post-inflating units along a row of presses and the line shaft 150 will be coupled to similar line shafts on adjacent machines by couplings 151, and the entire battery of post inflators will be driven from a common source.

On each post inflator there are located bearing blocks 152 which are secured to the upper ends of the stanchions 1. In order to rotate the tires there are provided two belts 155, each of which is in contact with the constantly driven shaft 150 and also with a pulley 156 mounted on the lower end of a swinging arm 158. The arm 158 is welded to a long sleeve 160 which is rotatable on the shaft 150.

When the tires are not rimmed up as illustrated in Fig. 1, the belts 156 are out of contact with them, but when the disks 80 approach the disks 60 to rim up the tires, the belts are lowered so that they make contact with the treads of the tires. The operation of raising and lowering the belts is done through a second pair of arms 162 welded to the sleeves 160. In the end of each arm 162 is a slot 164 through which passes a pin 165 located in a clevis 166 carried on the upper end of a long operating rod 168. The lower end of rod 168 has a clevis 169 which is pivoted by pin 170 to a bracket 172 welded to the rocker arm 42.

It will be seen that the weight of the arm 158 and connected parts will tend to hold the belt 155 against the tread of the tire and this is the condition when the tire is rimmed up. However, when the rimming-up disks 80 are withdrawn to the center of the machine the rotation of the cam disk 52 will move the rod 168 downwardly raising the belt assembly away from the tread of the tire as shown in Fig. 3.

Referring to Fig. 14, a multi-way solenoid-operated valve V is connected to opposite ends of the cylinder 25 by conduits 25–1 and 25–2, the central portion of the valve chamber being connected to a supply of fluid pressure by a conduit $V_1$ and the ends being connected to exhaust by conduits $V_2$ and $V_3$. The valve V is shown in the open position, that is, in position to conduct pressure to the upper end of cylinder 25 and move the rimming-up disks 80 to open position.

When two tires are removed from the press and placed in the post-inflation machine, as shown in Fig. 1, the operator immediately presses the push button switch P.B. which energizes solenoid coil $C_1$ and moves the piston P of valve V to the right, connecting supply conduit $V_1$ to conduit 25–1 and conduit 25–2 to exhaust $V_3$. This raises the piston rod 110 of cylinder 25, rotating the cam disk 52 clockwise and the links 118 and 119 move the disks 80 to their closed positions adjacent the disks 60 to engage the beads of the tires.

As the cam disk 52 nears the end of its rotation, a projection 52A on the disk engages the stem V to open an air valve $VA_1$ in the compressed air line L which supplies air through the rimming-up disks 80 to inflate the tires engaged by the disks. A solenoid-operated valve $VA_2$ in the line L is normally open in one direction to allow air to flow through conduits $L_1$ and $L_2$ to the disks 80. When the pressure in the tires reaches a predetermined amount, the pressure in the lines $L_1$ and $L_2$ operates a pressure switch PS to electrically open the switch and prevent any possibility of energizing the solenoid coil $C_2$ by the timer switch TS, which would result in opening the disks 80 while the tires are inflated.

During the cooling period, the timer opens the normally closed solenoid-operated valve V through a switch $TS_1$ to supply water to the sprays 140. When the tires have been cooled for a sufficient period the timer actuates valve $VA_2$ to connect conduits $L_1$ and $L_2$ to the exhaust port of the valve to exhaust the air from the tires and allow pressure switch PS to close, and then closes switch TS to energize solenoid coil $C_2$ and reverse the valve $V_1$, causing the piston rod to move downwardly and open the disks 80.

Figure 12:
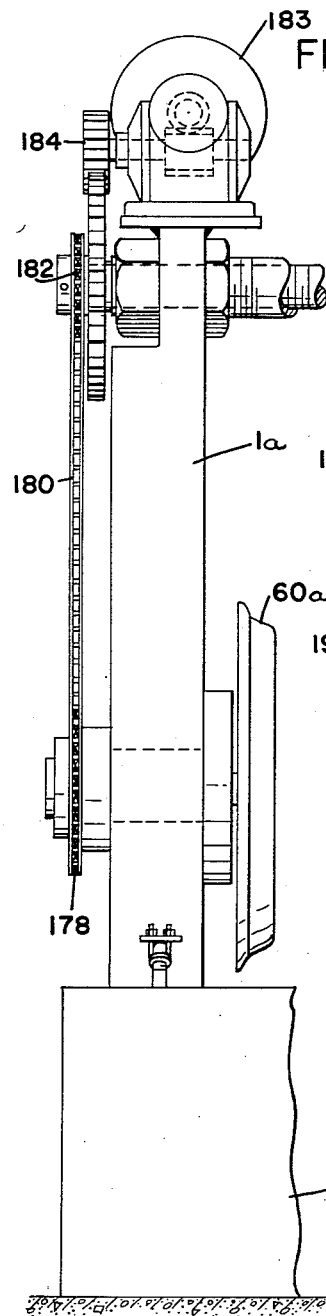
Fig. 12 is a view showing the modified form of drive in which the tire is rotated from the bead.
Figure 13:
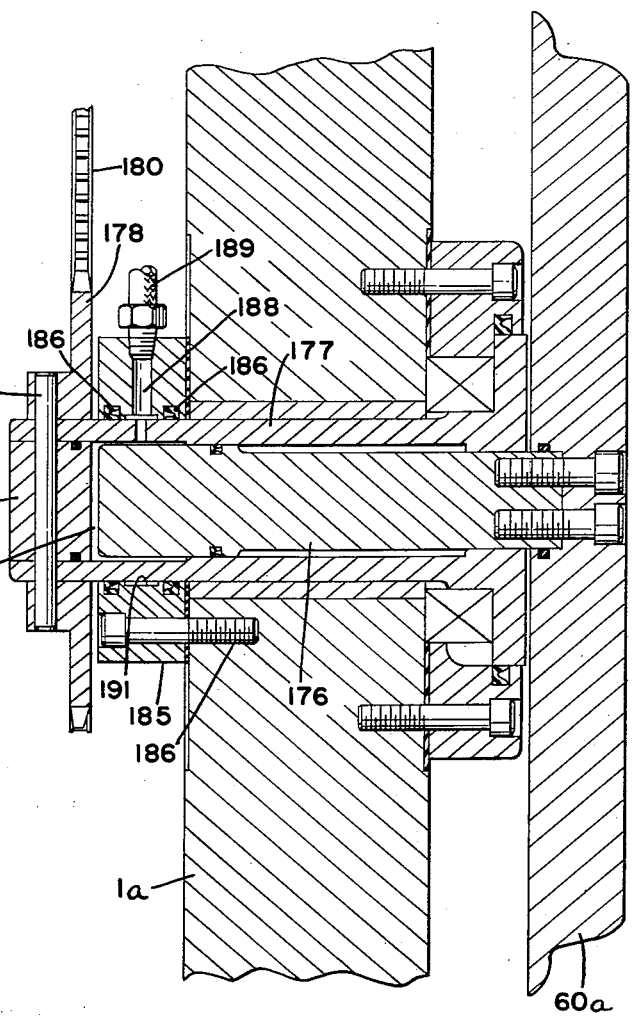
Fig. 13 is an enlarged section through the rimming-up disk.

In the modification shown in Figs. 12 and 13 the tire is driven from the outer rimming-up disk 60a. The disk 60a is secured to the end of a shaft 176 about which is a revolving sleeve 177 which is driven through a sprocket 178 pinned at 179 to the end of the sleeve which projects from the stanchion 1a. A plug 181 is held by the pin in the outer end of the sleeve. A chain 180 drives the disk 60a from a sprocket 182. The power to drive the sprocket comes from a small constantly driven motor 183 mounted on top of the stanchion 1a and connected to the sprocket through a gear reduction unit 184. Surrounding the sleeve 177 is a collar 185 which is fixed to the stanchion 1a and is sealed against air loss by the packing glands 186. The collar has a radial passage 188 which is connected to a source of pressure through the air line 189. The inner end of the passage 188 communicates with a recess 191 in the inner face of the collar and the end of the sleeve 177 is recessed to provide an air chamber 192. It will be noted that pressure from the line 189 normally moves the shaft 176 outwardly so that disk 60a is kept out of contact with the face of sleeve 177; however, when the disk 60a is forced inwardly by the linkage which moves the companion disk 80, the pressure in the chamber will be overcome and the inner face of the disk 60a will frictionally contact the face of sleeve 177, and the tire will be rotated while it is cooling.

Moreover, the movement of the shaft 176 and disk 60a outwardly by the air pressure behind the shaft is sufficient for the purpose of rimming-up tires which do not have curing bags, in which case it is necessary to force the tire beads together from both sides to assure proper rimming-up of the tires.

It will be seen that there has been provided a simple and efficient unit which will take one or two tires as they are deposited therein, and hold them momentarily in position to be engaged at their beaded edges by the rimming-up disks. This is under control of the operator who presses a starter button, not shown, which actuates the cylinder 25. As soon as the beads of the tires are engaged, the temporary supports drop away and the tire is started in rotation. The spray may be turned on by the timer and after the cooling period has passed, the disks will separate, stopping the rotation of the tire and the spray will be shut off.

It will be understood that the foregoing description is of the best known and preferred form of the invention and that changes and modifications may be made therein without departing from the basic principles of the invention as set forth in the appended claims. It is possible, for example, to use the unit without the tire rotating means if the tire is cured without the air bag.

What is claimed is:

1. A unit for treating tires after they are removed from a vulcanizer, comprising means for supporting a tire in a substantially upright position by its tread surface, rotatable disks movable into sealing engagement with the beads of the tire, means to remove the tire support when the disks are in engagement with the tire beads, means to rotate the tire during the cooling period, and means to inflate the tire during the cooling period.

2. A unit for treating tires after they are removed from a vulcanizer, comprising means for supporting a tire in a substantially upright position by its tread surface, rotatable disks movable into sealing engagement with the beads of the tire, means to remove the tire support when the disks are in engagement with the tire beads, a spray device to cool the tire, means to rotate the tire during the cooling period, and means to inflate the tire during the cooling period.

3. A unit for treating tires in an upright position after they are removed from a vulcanizer, comprising a temporary support for the tire, an inner and an outer disk having surfaces to engage the beads of the tire, means to move the inner disk toward the outer disk, fluid pressure means to move the outer disk a limited amount toward the inner disk, means to remove the temporary support when the disks are brought into engagement with the tire beads, and means to inflate the tire while it is held by the disks.

4. A unit for treating tires in an upright position after they are removed from a vulcanizer, comprising a temporary support for the tire, an inner and an outer disk having surfaces to engage the beads of the tire, means to move the inner disk toward the outer disk, fluid pressure means to move the outer disk a limited amount toward the inner disk, means to remove the temporary support when the disks are brought into engagement with the tire beads, means to rotate the tires for a cooling period, and means to inflate the tire during the cooling period.

5. A unit for treating tires in an upright position after they are removed from a vulcanizer, comprising means for supporting a tire by its tread surface, an inner and an outer disk having surfaces to engage the beads of the tire, means to move the inner disk toward the outer disk to seal the beaded edges of the tire, fluid pressure means to move the outer disk a limited amount toward the inner disk, said supporting means being movable away from the tire when the disks engage the tire, and means to inflate the tire while it is held by the disks.

6. In apparatus for holding and inflating tires, during a cooling period following vulcanization, between opposed closures having bead seats to engage the beads of said tires, the combination of: a rectangular frame including center and end stanchions having a longitudinal tie rod through the lower portions thereof, said closures being rotatably mounted in the upper portions thereof; at least two sets of similar but oppositely directed rocker arms pivotally mounted on said tie rod transversely of said frame below said opposed closures; means on the same end of each rocker arm for cooperatively supporting a tire in a substantially upright position; cam followers on the other end of each rocker arm; cam disks on said center stanchion engaging said cam followers; and means to simultaneously actuate said cam disks to move said rocker arms and elevate the beads of said tires into alignment with the opposed closures.

7. In apparatus for holding and inflating tires, during a cooling period following vulcanization, between opposed closures having bead seats to engage the beads of said tires, the combination of: a rectangular frame including center and end stanchions having a longitudinal tie rod through the lower portions thereof, said closures being rotatably mounted in the upper portions thereof; at least two sets of similar but oppositely directed rocker arms pivotally mounted on said tie rod transversely of said frame below said opposed closures; means on the same end of each rocker arm for cooperatively supporting a tire in a substantially upright position; cam followers on the other end of each rocker arm; cam disks journaled in said center stanchion transversely of said frame engaging said cam followers; and means to simultaneously rotate said cam disks to move said rocker arms and elevate the beads of said tires into alignment with the opposed closures.

8. In apparatus for holding and inflating two tires, during a cooling period following vulcanization, between two pairs of opposed closures having bead seats to engage the beads of said tires, the combination of: a rectangular frame including center and end stanchions having a longitudinal tie rod through the lower portions thereof, each pair of opposed closures being mounted in the upper portions of the center and an end stanchion; two pairs of two sets of similar but oppositely directed rocker arms pivotally mounted on said tie rod transversely of said frame between the center and an end stanchion; means on the same end of each set of rocker arms for cooperatively supporting said tires in a substantially upright position; cam followers on the other end of each set of rocker arms; cam disks on said center stanchion engaging said cam followers; and means to simultaneously actuate said cam disks to move said rocker arms and elevate the beads of a tire into alignment with each pair of opposed closures.

9. Apparatus for holding and inflating a tire during a cooling period following vulcanization, comprising, a generally rectangular frame having spaced-apart upright stanchions, a fixed closure mounted in one of said stanchions, a slidable closure mounted in another of said stanchions, said fixed and slidable closures each having bead seats to engage with the beads of a tire and being opposed to each other on a substantially horizontal common axis, removable means on said frame between said stanchions to support a tire in a substantially upright position between said closures, and means to move said slidable closure and a tire so supported toward and into engagement with said fixed closure.

10. Apparatus for holding and inflating tires during a cooling period following vulcanization, comprising, a generally rectangular frame including center and end stanchions, a fixed closure rotatably journaled in an end stanchion and a slidable closure rotatably journaled in a center stanchion opposing each fixed closure on a substantially horizontal common axis, said fixed and slidable closures each having bead seats to engage with the beads of tires, removable means extending transversely of said frame between each end and the center stanchion to support a tire in substantially upright position between said closures; and means to move said slidable closure and a tire so supported toward and into engagement with said fixed closure.

11. Apparatus for holding and inflating tires during a cooling period following vulcanization, comprising; a rectangular frame including center and end stanchions having a longitudinal tie rod through the lower portions thereof; a fixed closure rotatably journaled in the upper portion of an end stanchion and a slidable closure rotatably journaled in a center stanchion opposing each fixed closure on a substantially horizontal common axis, said fixed and slidable closures each having bead seats to engage with the beads of tires; at least two sets of similar but oppositely directed rocker arms pivotally mounted on side tire rod transversely of said frame below said closures; means on the same end of each rocker arm for cooperatively supporting a tire in a substantially upright position; cam followers on the other end of each rocker arm; cam disks journaled in said center stanchion between said slidable closures and engaging said cam followers; and means to move said slidable closures and tires toward and itno engagement with said fixed closures and to actuate said cam disks to move said rocker arms.

12. Apparatus according to claim 11 in which the tire support means on said rocker arms position tires in an elevated position aligned with the common axis of said closures and are lowered by the actuation of said cam disks when both a fixed and a slidable closure have contacted a tire.

13. Apparatus according to claim 11 in which the means to move said slidable closures and to actuate said cam disks are powered by a single pressure operated cylinder.

References Cited in the file of this patent

UNITED STATES PATENTS

| | | |
|---|---|---|
| 1,022,709 | Smith | Apr. 9, 1912 |
| 1,738,027 | Wood | Dec. 3, 1929 |
| 1,920,852 | Feinen | Aug. 1, 1933 |
| 1,954,920 | Damerell | Apr. 17, 1934 |
| 2,045,937 | Woock | June 30, 1936 |
| 2,193,119 | Bailey | Mar. 12, 1940 |
| 2,443,955 | Guzik | June 22, 1948 |
| 2,559,591 | Burkey | July 10, 1951 |

FOREIGN PATENTS

| | | |
|---|---|---|
| 1580/56 | Union of South Africa | Nov. 29, 1955 |

UNITED STATES PATENT OFFICE
CERTIFICATION OF CORRECTION

Patent No. 2,963,737                                   December 13, 1960

Leslie E. Soderquist

It is hereby certified that error appears in the above numbered patent requiring correction and that the said Letters Patent should read as corrected below.

Column 9, line 31, for "on side tire rod" read -- on said tie rod --; column 10, line 6, for "itno" read -- into --.

Signed and sealed this 11th day of July 1961.

(SEAL)
Attest:

ERNEST W. SWIDER                                        DAVID L. LADD

Attesting Officer                                            Commissioner of Patents